UNITED STATES PATENT OFFICE.

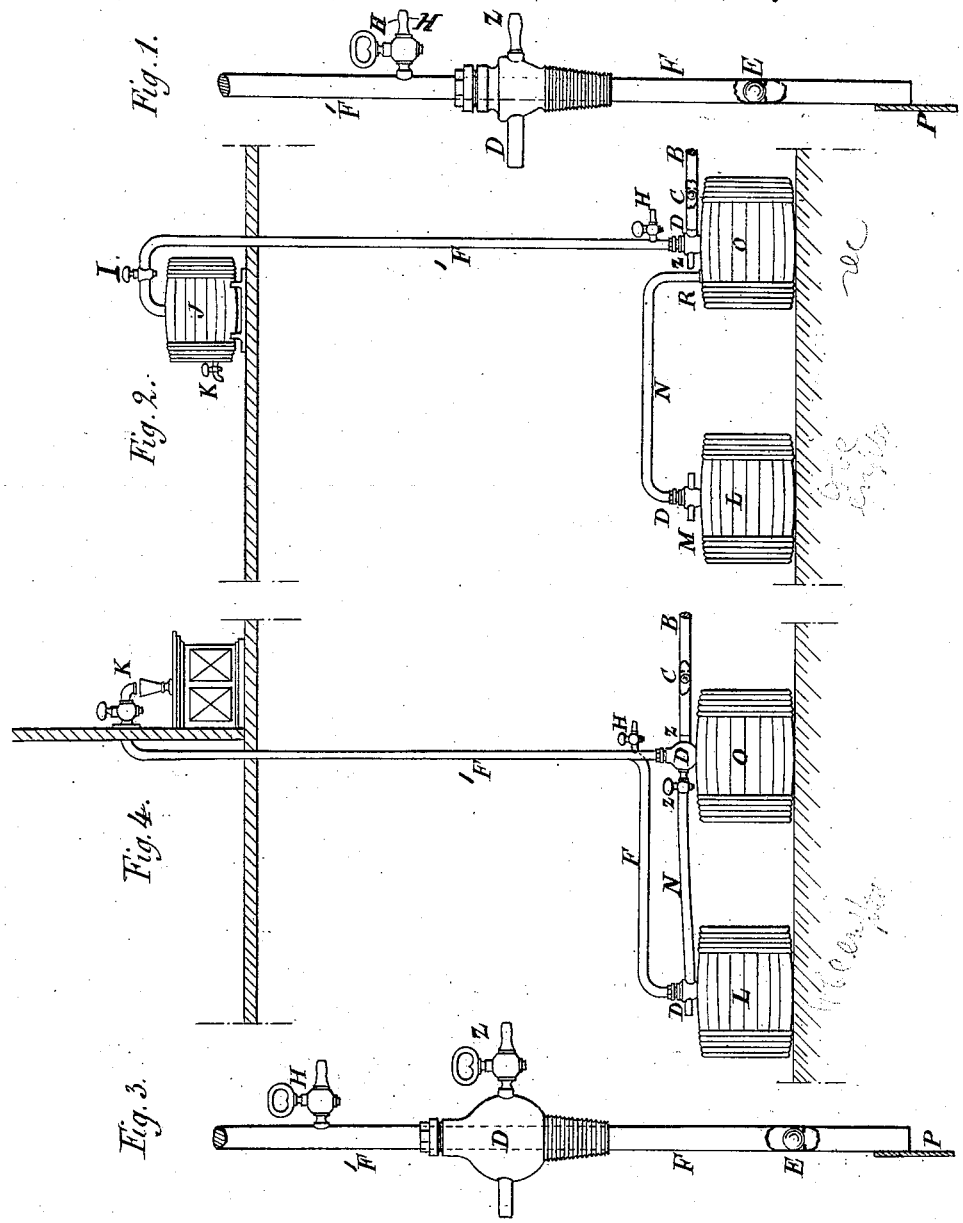

CLÉMENT LABURTHE, OF PARIS, FRANCE.

IMPROVEMENT IN PUMPING APPARATUS FOR RAISING WINE, BEER, &c.

Specification forming part of Letters Patent No. 193,371, dated July 24, 1877; application filed January 9, 1877.

*To all whom it may concern:*

Be it known that I, CLÉMENT LABURTHE, of Paris, in the Republic of France, have invented a certain Improved Apparatus for Raising Wine, Beer, and other Liquids, of which the following is a specification:

My improved apparatus consists of a special construction and combination of devices, hereinafter described, for transmitting liquids from one cask or vessel to another, and of delivering it for use.

In the accompanying drawing, Figure 1 shows my invention arranged for wine and other analogous liquors. Fig. 2 shows the apparatus ready for working. Fig. 3 shows the arrangement I employ for beer, and Fig. 4 shows this apparatus ready for working for the supply of beer or other analogous drink.

O is a fixed cask, serving as a receiver. L is one of the casks to be emptied. J is the cask in which is stored the liquid above the cellar; B, the air-tube, which may be connected with any appropriate force-pump, (not necessary to be here shown or described;) C, retaining-valve preventing the escape of the air from the barrel. D, Fig. 1, is the screw-bung placed on the cask to be emptied. It is provided with a plunger-tube, F, furnished with a retaining-valve, E, preventing the descent of the liquid in the ascension-tube F'. The tube F has a slide, P, for regulating the position of the lower opening, which should always be above the level of the sediment in the cask. The tube F' is provided with a cock, H, serving to permit the rising of the liquid it contains, and another cock, I, for stopping the liquid when the cask J is full. Z is a tube joined to the bung, and with or without a cock, for communicating with the air-pump or with the other casks. D, Fig. 3, is a bung containing an air-reservoir, serving to empty the casks of beer.

This apparatus may be employed in all cases where it is required to transmit liquids without coming in contact with the air or carrying it in vessels. Carbonic-acid gas or other gas may be pressed on the surface of the liquid, if required, instead of air.

What I claim is—

1. The combination of the bung D, plunger-tube F, retaining-valve E, and ascension-tube F', furnished with the stop-cocks I and H, as shown and described.

2. In combination with tube B, adapted to be connected to an air-pump for exhausting air from an emptied cask, a retaining-valve, C, with one or several bungs, D, serving to empty, by means of the pressure of air or other gas, either a single cask or a series of casks, one into the other.

CT. LABURTHE.

Witnesses:
 LÉPINET, H.,
 J. F. DUFRENÉ.